(12) United States Patent
Chavez et al.

(10) Patent No.: US 7,946,611 B2
(45) Date of Patent: May 24, 2011

(54) KNEE AIRBAG MODULE

(75) Inventors: Spencer W. Chavez, Linden, MI (US); Gary A. Card, Macomb Township, MI (US); John P. Ruterbusch, Royal Oak, MI (US)

(73) Assignee: TK Holdings Inc., Auburn Hills, MI (US)

( * ) Notice: Subject to any disclaimer, the term of this patent is extended or adjusted under 35 U.S.C. 154(b) by 107 days.

(21) Appl. No.: 12/385,147

(22) Filed: Mar. 31, 2009

(65) Prior Publication Data

US 2010/0244410 A1 Sep. 30, 2010

(51) Int. Cl.
*B60R 21/04* (2006.01)
*B60R 21/045* (2006.01)
*B60R 21/205* (2006.01)

(52) U.S. Cl. .................. 280/728.2; 280/730.1; 280/753

(58) Field of Classification Search ............... 280/728.2, 280/728.3, 730.1, 731, 750, 751, 752, 753
See application file for complete search history.

(56) References Cited

U.S. PATENT DOCUMENTS

| | | | | |
|---|---|---|---|---|
| 5,335,937 A * | 8/1994 | Uphues et al. | ............ | 280/728.3 |
| 5,676,393 A * | 10/1997 | Rose | ........................... | 280/728.3 |
| 5,833,263 A * | 11/1998 | Wittmann et al. | ......... | 280/728.3 |
| 7,029,026 B2 * | 4/2006 | Morita | ....................... | 280/728.3 |
| 7,748,732 B2 * | 7/2010 | Sella et al. | .................. | 280/728.3 |
| 2004/0124617 A1 * | 7/2004 | Morita | .......................... | 280/732 |
| 2005/0258624 A1 * | 11/2005 | Abraham et al. | .......... | 280/728.3 |
| 2008/0100044 A1 * | 5/2008 | Cho | ........................... | 280/730.2 |

* cited by examiner

*Primary Examiner* — Eric Culbreth
*Assistant Examiner* — Joseph Rocca
(74) *Attorney, Agent, or Firm* — Foley & Lardner LLP

(57) ABSTRACT

An airbag module for protecting the knees of an occupant located in an occupant compartment of a vehicle, the airbag module configured to be mounted behind an instrument panel of the vehicle and including a housing; and an airbag configured to be filled with an inflation gas. The housing may surround the airbag. The housing may include two connected portions. The housing may also be configured so that when the airbag is inflated and deploys the two portions of the housing disconnect and the first housing portion bends downward into a position where the first portion forms a ramp to guide the airbag from a stored position into the occupant compartment. The airbag module may also include a mounting mechanism configured to mount the housing to the instrument panel.

14 Claims, 5 Drawing Sheets

KNEE AIRBAG MODULE

BACKGROUND

This application relates generally to the field of driver and passenger protection devices in automobiles. More specifically, this application relates to a modular knee airbag having connected portions with the ability to guide the deployment of the airbag such that the knee airbag does not deploy behind the instrument panel of the vehicle.

Knee airbags are stored in vehicles to protect the knees and lower legs of an occupant from striking against the interior of a vehicle during a collision. Conventional modular knee airbags are normally stored in a folded state and located in a cavity disposed in a Class-A surface cover. Most of the knee airbags are rear deploying in nature. In the event of a vehicle collision, a knee airbag is deployed and inflated in the vehicle interior by gas produced by an inflator. The inflated knee airbag deploys upward to restrain the knees of an occupant.

SUMMARY

According to a disclosed embodiment, a knee airbag module is provided. The knee airbag is configured to provide for improved occupant protection. For example, the disclosed knee airbag is configured to deploy into a position to provide for total energy management of loads applied to the occupant of the vehicle. The deployed airbag provides for reducing loads to the knees and femur regions of a vehicle occupant. Furthermore, the disclosed knee airbag is configured to deploy into a position that influences the position of the occupant so that other restraint devices such as, for example, airbags and seat belt systems provide enhanced and improved protection for the occupant. Furthermore, the deployed position of the knee airbag may reduce the likelihood of the occupant contact the header of the vehicle.

It is also desirable for an existing modular knee airbag design to be easily modified to include the cushion or airbag design described herein and/or mounting tabs of the modular knee airbag.

One disclosed embodiment relates to an airbag module for protecting the lower body of an occupant located in an occupant compartment of a vehicle, the airbag module configured to be mounted behind an instrument panel of the vehicle and including a housing; and an airbag configured to be filled with an inflation gas. The housing may surround the airbag. The housing may include two connected portions. The housing may also be configured so that when the airbag is inflated and deploys the two portions of the housing disconnect and the first housing portion bends downward into a position where the first portion forms a ramp to guide the airbag from a stored position into the occupant compartment and wherein the second portion bends up into a position adjacent to the instrument panel so that when the airbag is fully deployed the second portion is sandwiched between the airbag and the instrument panel.

Another disclosed embodiment relates to an airbag module for protecting the lower body of an occupant located in an occupant compartment of a vehicle, the airbag module configured to be mounted behind an instrument panel of the vehicle and including a housing; and an airbag configured to be filled with an inflation gas. The housing may surround the airbag. The housing may include two connected portions. The housing may also be configured so that when the airbag is inflated and deploys the two portions of the housing disconnect and the first housing portion bends downward into a position where the first portion forms a ramp to guide the airbag from a stored position into the occupant compartment.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate preferred embodiments of the invention and together with the description serve to explain principles of the invention.

DETAILED DESCRIPTION

Figure 1:
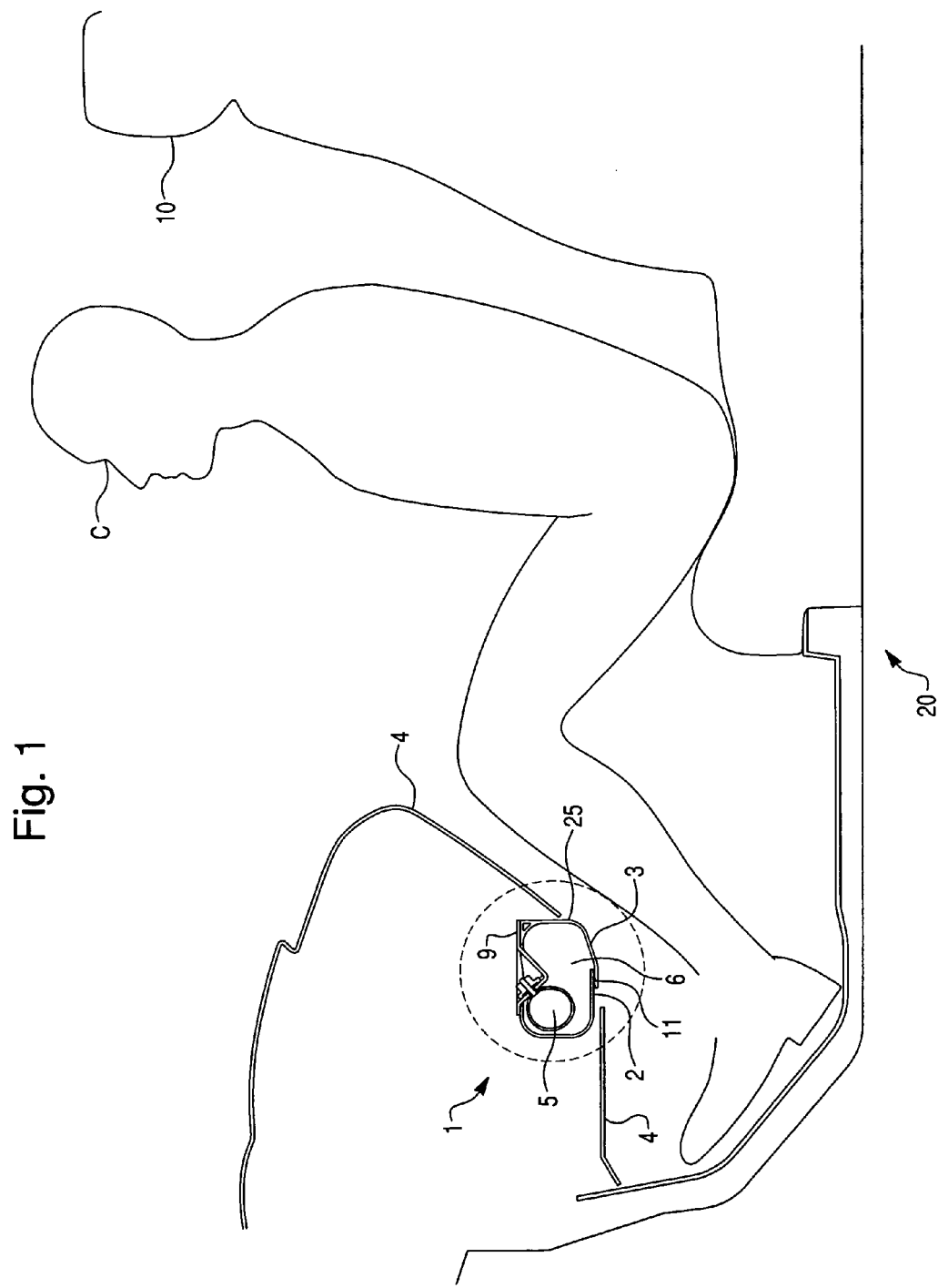
FIG. 1 is a side view of a portion of a vehicle including a seat with a modular knee airbag according to an exemplary embodiment.

Embodiments will be described with reference to the accompanying drawings. FIG. 1 shows a portion of a vehicle 20 located in the occupant compartment of the vehicle, including a seat 10 and a modular knee airbag 1, where an occupant C is positioned in the seat 10. The knee airbag module 1 includes an inflator 5, an airbag 6, a housing 25 having a first portion 2, and a second portion 3. A first part of the module 1 is mounted to the instrument panel 4 by a mounting mechanism 9. The first portion 2 and the second portion 3 of the housing 25 abut the instrument panel 4.

Figure 2:
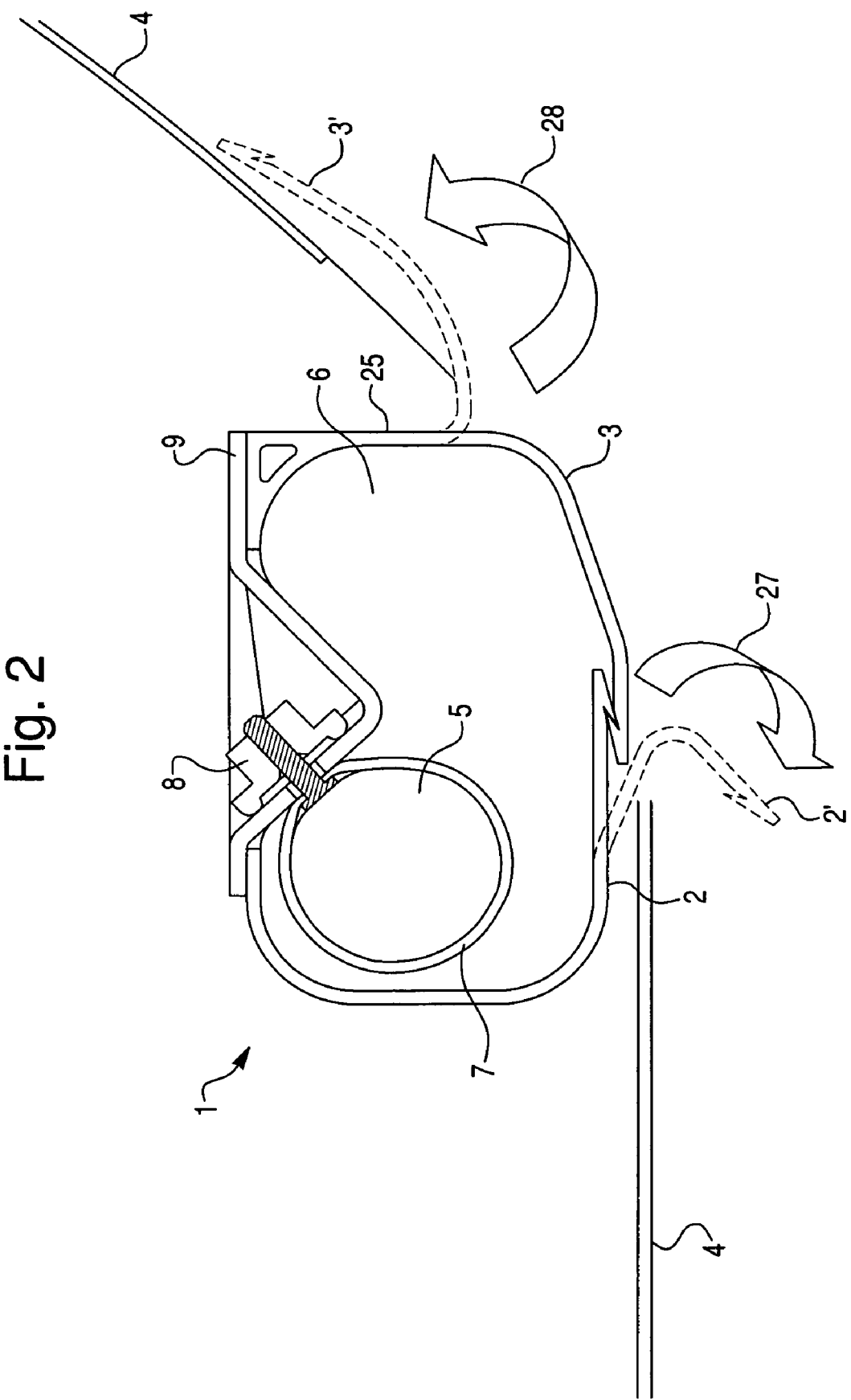
FIG. 2 is a side view of a modular knee airbag positioned in an instrument panel showing the connecting portions of the module before and after deployment of the knee airbag according to an exemplary embodiment.
Figure 4:
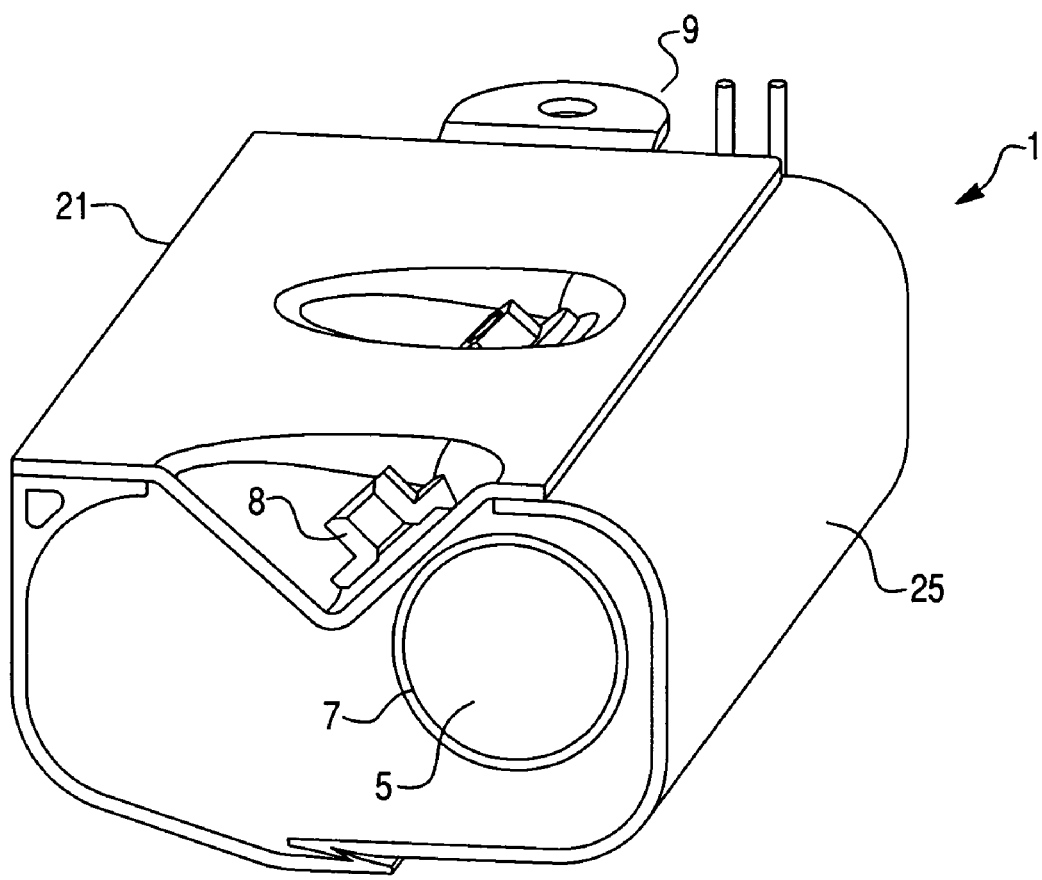
FIG. 4 is a side view of a modular knee airbag according to one embodiment.

As can be seen in FIG. 1, the first portion 2 and the second portion 3 of the housing 25 are connected. The first portion 2 and the second portion 3 may be integrally connected. For example, the first portion 2 and the second portion 3 may be a single, unitary piece. The single piece may include a weakened section 11. During a vehicle collision, the airbag 6 deploys and causes the weakened section 11 to tear, thereby enabling the deployed airbag to encounter and protect the knees of the occupant C. In another embodiment, the first portion 2 and the second portion 3 may be two separate pieces. The first portion 2 and the second portion 3 may be connected by any suitable mechanism. For example, the first portion 2 and the second portion 3 may each include a latching or clasping mechanism such as, for example, a hook and interconnected opening. Alternatively, as shown in FIGS. 2 and 4, the clasping mechanism may be configured as tow corresponding hooks or toothed sections that may be configured to clasp together prior to deployment of the airbag 6. The clasping mechanism releases during deployment of the airbag 6. For example, the clasping mechanism of one portion may clasp on to the clasping mechanism of the other portion. In an alternative embodiment, only the first portion 2 or the second portion 3 may include a clasping mechanism. The portion including the clasping mechanism, clasps onto the portion not including a clasping mechanism. During deployment of the airbag, the clasping mechanism disconnects from the portion that does not include the clasping mechanism. The clasping mechanism may be, for example, a hook or a buckle.

According to yet another embodiment, the first portion 2 and the second portion 3 may be connected by a clasping mechanism where one or both portions include an adhesive. In another embodiment, the first and second portions may be connected using a hook and loop type fastener. Before deployment of the airbag 6, the clasping mechanism keeps the first portion 2 and the second portion 3 connected to each other. During a vehicle collision, the airbag 6 deploys, thereby causing the first portion 2 and the second portion 3 to unclasp, separate or unfasten.

When a vehicle 20 collision occurs, the inflator 5 provides inflation gas to the airbag 6. As the inflator 5 provides gas to the airbag 6, the airbag 6 inflates and deploys. When the airbag 6 is inflated and deploys, the first portion 2 disconnects from the second portion 3. When the first portion 2 disconnects from the second portion 3, the airbag 6 enters the occupant C compartment of the vehicle 20, thereby protecting the occupant's C knees from being injured during the vehicle 20 collision.

FIG. 2 shows a side view of a modular knee airbag 1 according to an exemplary embodiment positioned in an instrument panel 4 showing the connecting portions 2, 3, of the module before and after deployment of the knee airbag 6. As shown in FIG. 2, the module includes a folded airbag or cushion pack 6, an inflator 5, a clamp or stud clamp 7, a fastener 8, a mounting mechanism 9, a housing includes a top portion 21 and two side portions (i.e., a first portion 2, a second portion 3). After deployment of the airbag, the first and second portions 2', 3' of the housing are shown in dashed lines.

Figure 5:
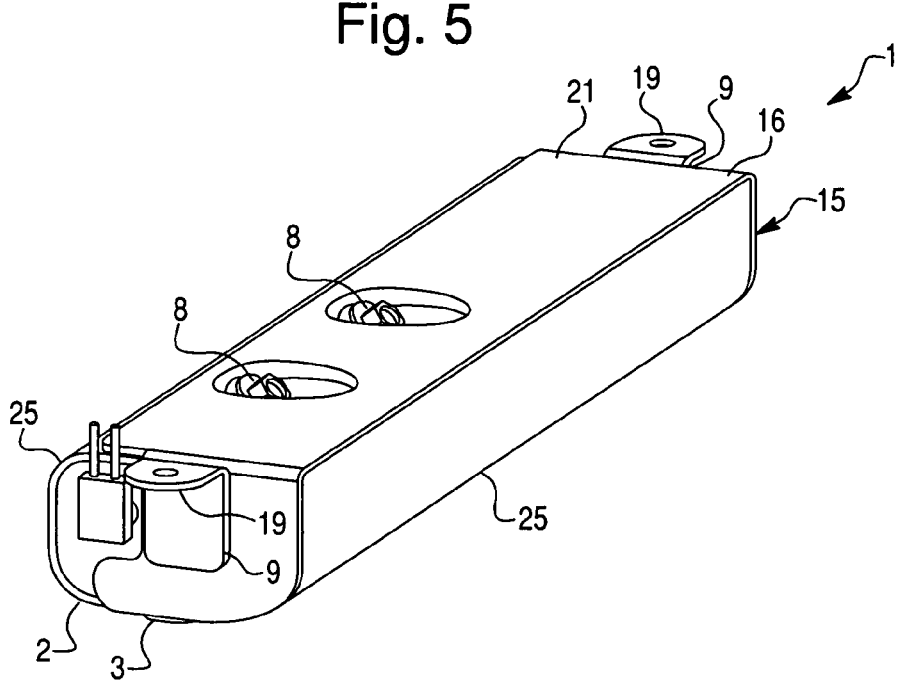
FIG. 5 is a side view of the modular knee airbag of FIG. 4.
Figure 6:
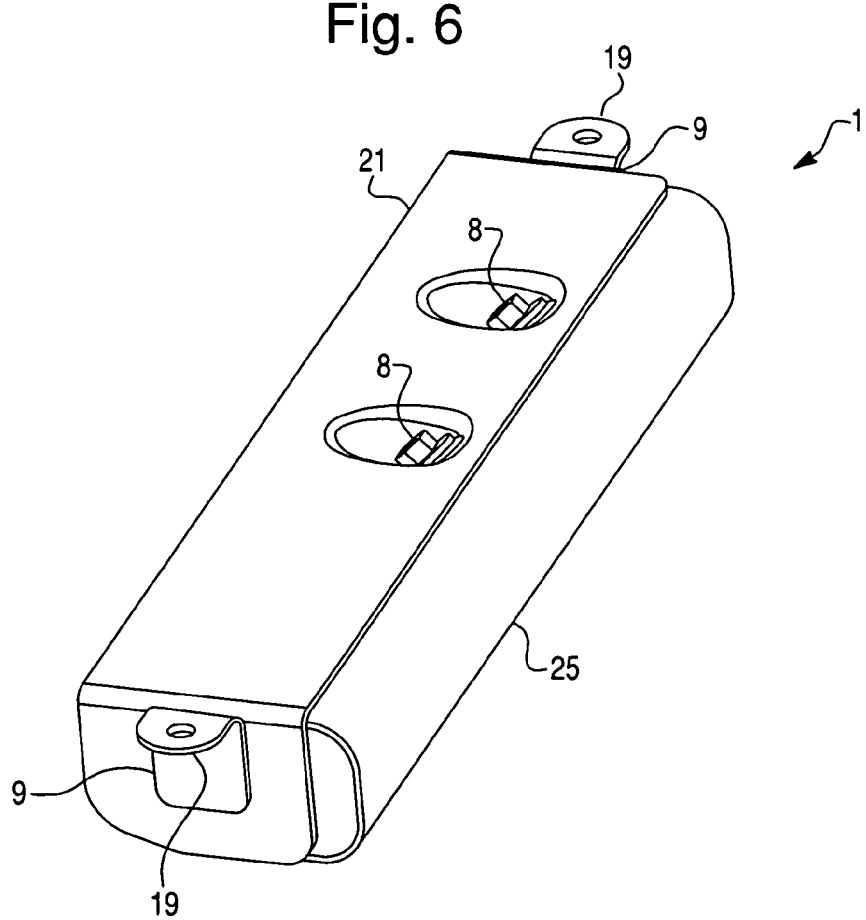
FIG. 6 is a side view of the modular knee airbag of FIG. 4.

The fastener 8 connects the inflator 5 to the housing 25. The fastener 8 may be any suitable fastener 8. For example, the fastener 8 may be a nut or screw. The fastener 8 may connect to a clamp 7 surrounding the inflator 5. When the fastener 8 and the clamp 7 are connected, the inflator 5 is firmly secured to the housing 25. As shown in FIGS. 5 and 6, there may be multiple fasteners 8 and clamps 7, so that the inflator 5 may be connected to the housing 25 at multiple locations.

The mounting mechanism 9 mounts the housing 25 to the instrument panel 4. FIGS. 4-6 show an example of a mounting mechanism 9. According to one embodiment, the mounting mechanism 9 may include side attachment brackets 19 or a plurality of attaching brackets 19 that are configured to connect to the vehicle frame or instrument panel 4 via a screw or any other suitable fastener. The brackets 19 may attach to the side faces and/or the the top portion or top face 21 of the mounting mechanism 9. The mounting mechanism 9 and brackets 19 may be made of steel or any suitable material. For example, the brackets 19 may be made of aluminum or plastic. Furthermore, the side brackets 19 may be integrally formed with the top and side portions of the mounting mechanism 9. The brackets 19 are dimensioned in order to accommodate different vehicle mounting locations, thereby increasing inflexibility for installing the modular knee airbag 1 in different vehicle types.

The brackets 19 lie in the same plane as and may be flush with the top portion 21 of the mounting mechanism 9. The mounting mechanism 9 may be made of steel or any suitable material For example, the top portion 21 may be made of aluminum. The top portion 21 of the mounting mechanism 9 may be connected to or integrated with the top portion of the housing 25 to form a modular design. As shown in FIG. 2, the mounting mechanism 9 is positioned adjacent to the housing 25. When the mounting mechanism 9 is connected to the instrument panel 4 (or other part of the vehicle), the mounting mechanism 9 may lie flush against the instrument panel 4. Other suitable types of mounting mechanisms 9 may also be used.

The sides and outer portion of the housing 25 may be made of a different material from the mounting mechanism 9. For example, according to one embodiment, the sides and outer portion 2, 3 of the housing 25 may be made of extruded plastic. The sides and outer portion 25, 2, 3 of the housing 25 are preferably relatively thin, thereby using less material than a typical housing 25. Because the housing 25 is relatively thin, the knee airbag 6 is able to occupy a maximum airbag or cushion space in the housing 25, during storage of the knee airbag 6.

The housing 25 shown in FIG. 2, illustrates an exemplary embodiment of the housing 25 before and after deployment of the airbag 6. The deployed airbag 6 is not shown in FIG. 2. Before deployment of the airbag 6, the first portion 2 and the second portion 3 are connected together.

During deployment of the airbag 6, the first portion and the second portion form ramps 2', 3'. The ramps 2', 3' guide the knee airbag 6 into the occupant compartment of the vehicle 20. The arrows 27, 28 show the trajectory of the first portion 2 and the second portion 3 during deployment. During the initial deployment stage of the airbag 6, the airbag exerts a force against the first portion 2. The force on the first portion 2 is transferred to the second portion 3 and causes both the first portion 2 and the second portion 3 to follow the trajectory as shown by the first arrow 27 and the second arrow 28. The first portion 2 bends and follows the trajectory as shown by the first arrow 27. The second portion 3 bends and follows the trajectory as shown by the second arrow 28. As the first portion 2 and the second portion 3 bend, the deploying airbag 6 follows the path created by the ramp 2' and the ramp 3'. Because the airbag 6 initially encounters the first portion 2 during deployment, the airbag 6 initially deploys in a downward direction, thus preventing the airbag 6 from deploying behind the instrument panel 4.

Figure 3:
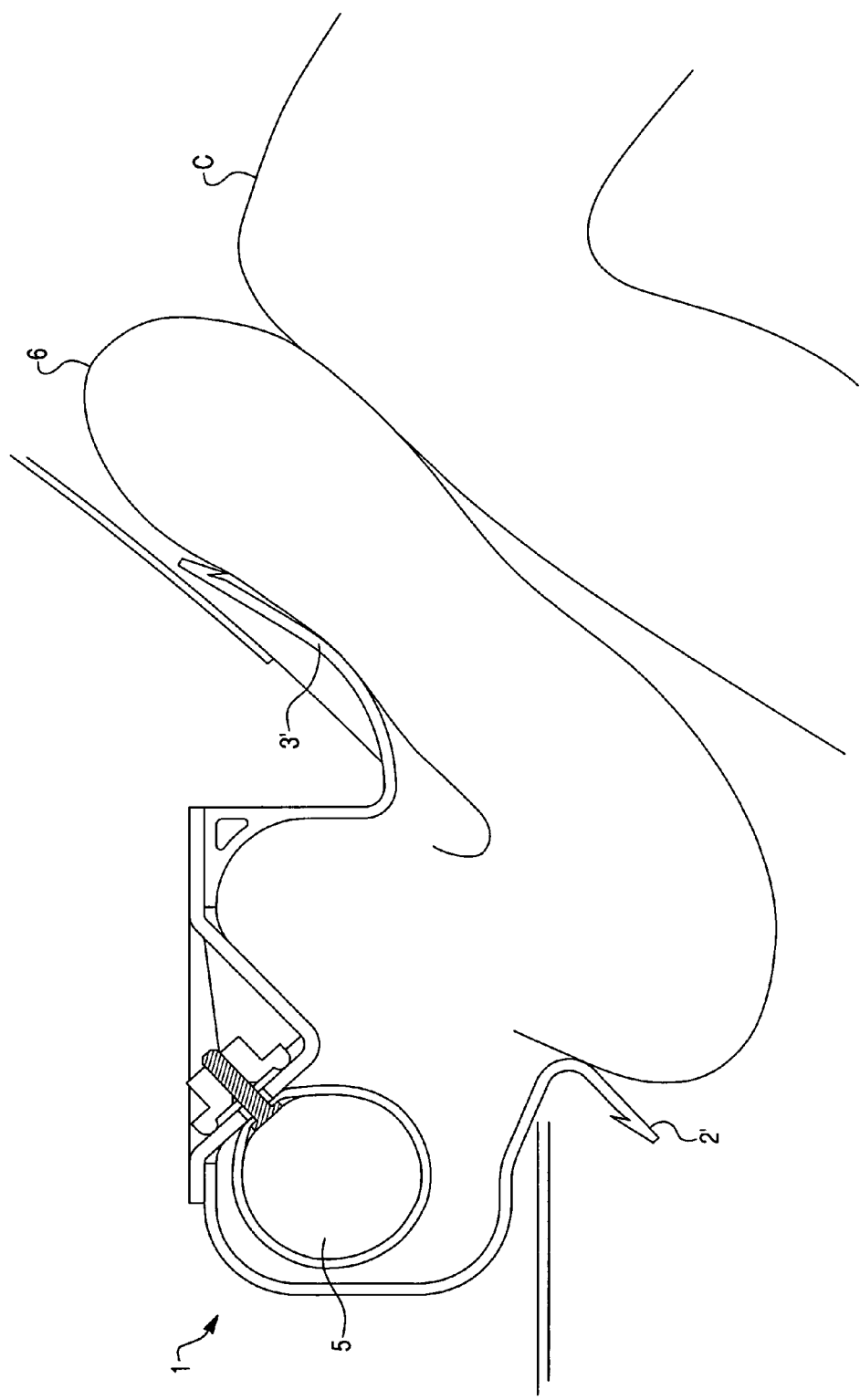
FIG. 3 is a side view of the modular knee airbag after deployment of the airbag according to an exemplary embodiment.

According to one embodiment, as shown in FIG. 3, when the airbag 6 is fully deployed the first portion after deployment 2' and the second portion after deployment 3' are positioned adjacent to the airbag 6. The first portion after deployment 2' may be positioned between the instrument panel 4 and the airbag 6. The second portion after deployment 3' may be sandwiched between the instrument panel 4 and the airbag 6.

In yet another embodiment, the airbag module 1 is configured similar to that of prior embodiments. However, during deployment of the airbag 6, only the first portion 2 forms a ramp 2. During deployment, the second portion 3 disconnects from the module 1, when the first portion 2 applies a force to the second portion 3. When the airbag 6 deploys, the airbag 6 follows the ramp 2', thereby preventing the airbag 6 from deploying behind the instrument panel 4.

The second portion 3 may include a weakened section that tears when the first portion 2 applies a force to the second portion 3. In the alternative, the second portion 3 may include multiple weakened sections that tear when the first portion 2 applies a force to the second portion 3, such that the second portion 3 separates into multiple pieces when the airbag 6 deploys. In yet another embodiment, the second portion 3 may include a mechanism configured to detach the second portion 3 from the housing 25 when the first portion 2 applies a force to the second portion 3.

According to another embodiment, only one of the portions 2, 3 of the modular airbag 1 abuts the instrument panel 4. The airbag 6 deployment is substantially the same as when the first portion 2 and the second portion 3 abut the instrument panel 4.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," "connected," and the like as used herein means the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements, for example "top," "bottom," "above," "below," etc., are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the modular knee airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag module for protecting the lower body of an occupant located in an occupant compartment of a vehicle, the airbag module configured to be mounted behind an instrument panel of the vehicle and comprising:
   a housing;
   a mounting mechanism, wherein the mounting mechanism is configured to mount the housing to the instrument panel; and
   an airbag configured to be filled with an inflation gas,
   wherein the housing surrounds the airbag,
   wherein the housing includes two connected portions,
   wherein the housing is configured so that when the airbag is inflated and deploys the two portions of the housing disconnect and the first housing portion bends downward into a position where the first portion forms a ramp to guide the airbag from a stored position into the occupant compartment and wherein the second portion bends up into a position adjacent to the instrument panel so that when the airbag is fully deployed the second portion is sandwiched between the airbag and the instrument panel, and
   wherein the mounting mechanism includes at least one side attachment bracket that connects to a vehicle frame or the instrument panel, and wherein the at least one side attachment bracket lies in the same plane as a top surface of the mounting mechanism, the top surface of the mounting mechanism being connected to or integrated with a top portion of the housing.

2. The module of claim 1, wherein the two portions are integrally connected to form a weakened section, such that when the airbag inflates the weakened section tears.

3. The module of claim 1, wherein the first portion and the second portion are separate pieces connected by a clasping mechanism.

4. The module of claim 3, wherein one of the connected portions includes the clasping mechanism.

5. The module of claim 3, wherein the clasping mechanism disconnects the portions from one another when a sufficient force applied by the airbag during deployment is applied to the clasping mechanism.

6. The module of claim 1, wherein the ramp is positioned near the edge of the instrument panel so that when the airbag is fully deployed the first portion is positioned in between the instrument panel and the airbag.

7. The module of claim 1, wherein the mounting mechanism includes a plurality of brackets.

8. An airbag module for protecting the lower body of an occupant located in an occupant compartment of a vehicle, the airbag module configured to be mounted behind an instrument panel of the vehicle and comprising:
   a housing;
   a mounting mechanism, wherein the mounting mechanism is configured to mount the housing to the instrument panel; and
   an airbag configured to be filled with an inflation gas,
   wherein the housing surrounds the airbag,
   wherein the housing includes two connected portions,
   wherein the housing is configured so that when the airbag is inflated and deploys the two portions of the housing disconnect and the first housing portion bends downward into a position where the first portion forms a ramp to guide the airbag from a stored position into the occupant compartment, and
   wherein the mounting mechanism includes at least one side attachment bracket that connects to a vehicle frame or the instrument panel, and wherein the at least one side attachment bracket lies in the same plane as a top surface of the mounting mechanism, the top surface of the mounting mechanism being connected to or integrated with a top portion of the housing.

9. The module of claim 8, wherein the second portion bends up into a position adjacent to the instrument panel so that when the airbag is fully deployed the second portion is sandwiched between the airbag and the instrument panel.

10. The module of claim 8, wherein the two portions are integrally connected to form a weakened section, such that when the airbag inflates the weakened section tears.

11. The module of claim 8, wherein the first portion and the second portion are separate pieces connected by a latch mechanism.

12. The module of claim 11, wherein one of the connected portions includes the latch mechanism.

13. The module of claim 8, wherein the ramp is positioned near the edge of an instrument panel so that when the airbag is fully deployed the first portion is positioned in between the instrument panel and the airbag.

14. The module of claim 8, wherein the mounting mechanism includes a plurality of brackets, and wherein the brackets are positioned on a face of the mounting mechanism configured to receive fasteners for connecting the module to a part of the vehicle.

* * * * *